United States Patent [19]

Teramachi

[11] Patent Number: 4,496,196
[45] Date of Patent: Jan. 29, 1985

[54] LINEAR SLIDE BEARING AND LINEAR SLIDE TABLE USING THIS BEARING

[76] Inventor: Hiroshi Teramachi, 34-8, Higashi-Tamagawa 2-chome, Setagaya-ku, Tokyo 158, Japan

[21] Appl. No.: 479,928

[22] Filed: Mar. 29, 1983

[30] Foreign Application Priority Data

Mar. 29, 1982 [JP] Japan .................................. 57-49170

[51] Int. Cl.³ ............................................. F16C 29/06
[52] U.S. Cl. ..................................................... 308/6 C
[58] Field of Search .............. 308/3 R, 3 A, 6 R, 6 C, 308/189 A, 207 A, 244

[56] References Cited

U.S. PATENT DOCUMENTS

| 3,721,478 | 3/1973 | Anderson et al. | 308/6 C |
| 3,940,186 | 2/1976 | Nilsson | 308/6 C |
| 4,231,621 | 11/1980 | Teramachi | 308/6 C |
| 4,296,974 | 10/1981 | Teramachi | 308/6 C |
| 4,302,059 | 11/1981 | Teramachi | 308/6 C |
| 4,390,215 | 6/1983 | Mottate | 308/6 C |

Primary Examiner—Stuart S. Levy
Assistant Examiner—David Werner
Attorney, Agent, or Firm—Armstrong, Nikaido, Marmelstein & Kubovcik

[57] ABSTRACT

A linear slide bearing is disclosed as having a slide block formed in cross section into the shape of letter C, the slide block having a recess on the underside and having an upwardly inclined surface on the upper inner side of one arm and a downwardly inclined surface on the inner side of the other arm; a guide rail having its upper portion formed into a shape similar to the recess of the slide block and having a downwardly inclined surface and an upwardly inclined surface, facing the upwardly inclined surface and the downwardly inclined surface, respectively, of the slide block; a pair of guide covers mounted to the both ends of the slide block; endless tracks formed by the no-load ball holes cut through both arms of the slide block, the load ball grooves semicircular in cross section formed in the upwardly and downwardly inclined surfaces of the slide block, the ball-rotating grooves semicircular in cross section formed in the upwardly and downwardly inclined surfaces of the guide rail, and by the guide groove formed in each guide cover; and a number of balls running through the endless tracks, the ball acting as a series of load ball or a series of no-load balls depending on where they are running in the endless track.

8 Claims, 19 Drawing Figures

LINEAR SLIDE BEARING AND LINEAR SLIDE TABLE USING THIS BEARING

BACKGROUND OF THE INVENTION

The present invention relates to a linear slide bearing and a linear slide table using this bearing.

This kind of bearing and table is widely used on the sliding mechanism of industrial machines such as machining centers, X-, Y- and Z-axis of numerical controlled machine tools, automatic tool exchange equipment, automatic welding machines, injection molding machines and industrial robots.

The conventional bearings and tables of this kind, however, are constructed such that the guide rail has a pair of ball-rotating grooves formed on each shoulder thereof and a row of load-carrying balls are run through each ball-rotating groove so that the bearing can hold the shoulders of the guide rail (the specification of the U.S. Pat. No. 3,897,982). Therefore, four grooves must be cut in each guide rail and it is also necessary to form an endless track for each ball-rotating groove, which in turn requires many machining processes.

SUMMARY OF THE INVENTION

The present invention has been accomplished to overcome various problems experienced with conventional linear slide bearings.

That is, the primary object of this invention is to provide a linear slide bearing which comprises: a slide block formed in cross section into the shape of letter C, the slide block having a recess on the underside and having an upwardly inclined surface on the upper inner side of one arm and a downwardly inclined surface on the inner side of the other arm; a guide rail having its upper portion formed into a shape similar to the recess of the slide block in cross section and having a downwardly inclined surface and an upwardly inclined surface, facing the upwardly inclined surface and downwardly inclined surface, respectively, of the slide block; a pair of guide covers mounted to both ends of the slide block; endless tracks formed by the no-load ball holes cut through both arms of the slide block, the load ball grooves semicircular in cross section formed in the upwardly and downwardly inclined surfaces of the slide block, the ball-rotating grooves semicircular in cross section formed in the upwardly and downardly inclined surfaces of the guide rail, and by the guide grooves formed in the guide covers; and a number of balls running through the endless tracks, the ball acting as a series of load balls or a series of no-load balls depending on where they are running in the endless track, so that the linear slide bearing of the above construction can halve the number of load ball grooves and the ball-rotating grooves and therefore can be manufactured at low cost.

The second object of this invention is to provide a linear slide bearing which has a ball retainer between the pair of guide covers so that when the slide block is removed from the guide rail the balls will not drop from the slide block.

The third object of this invention is to provide a linear slide table which has a mounting table installed on a pair of slide blocks of the bearings with the guide rails secured to the base surface of the bed.

The fourth object of this invention is to provide a linear slide table which can apply a preload to each bearing by tightening bolts which fastens together the mounting table and the slide blocks.

DESCRIPTION OF THE PREFERRED EMBODIMENTS

Figure 1:
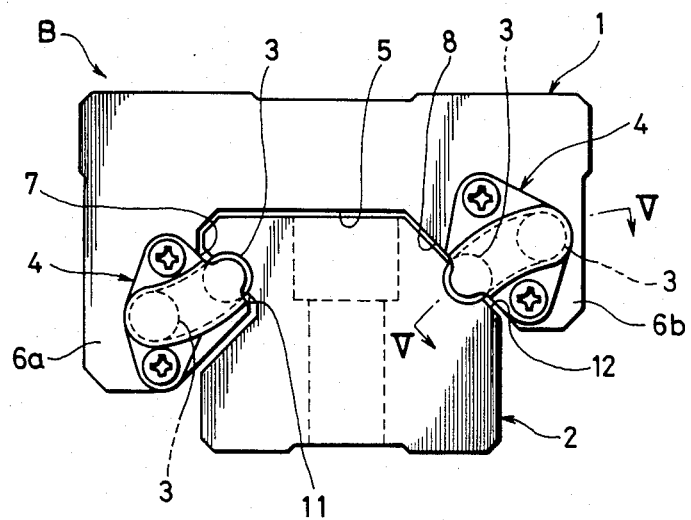
FIG. 1 is a side view showing the first embodiment of the linear slide bearing of this invention.
Figure 2:
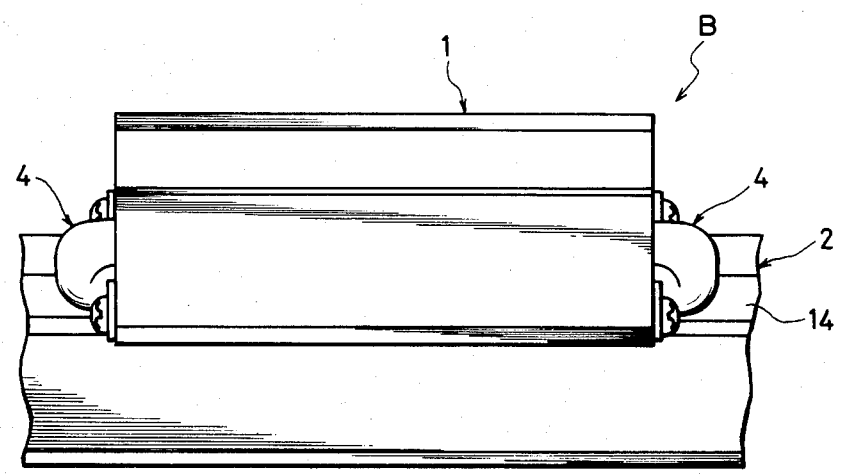
FIG. 2 is a front view of the linear slide bearing as shown in FIG. 1.
Figure 3:
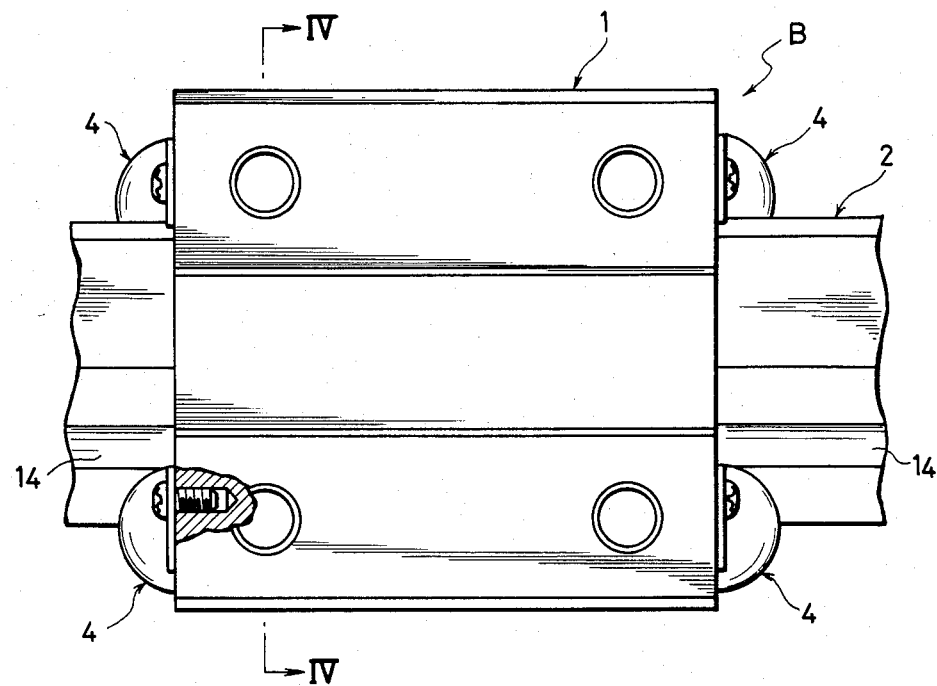
FIG. 3 is a plan view of the linear slide bearing as shown in FIG. 1.

Referring to the attached drawings, detailed explanation is given in the following as to the linear slide bearing and the linear slide table using this bearing.

FIGS. 1 through 7 show the first embodiment of the linear slide bearing B of this embodiment. The slide bearing B consists of: a slide block 1 formed into the shape of letter "C" in cross section having a recess 5 at the underside thereof; a guide rail 2 with its upper portion formed in cross section into the shape similar to that of the recess 5 of the slide block 1; a number of balls 3; and guide covers 4 attached to the ends of the slide block 1 on each side thereof to guide the balls 3 for circulation.

One arm 6a of the slide block 1 has an upwardly inclined surface 7 on the upper inner side and the other arm 6b has a downwardly inclined surface 8 on the inner side. The upwardly and downwardly inclined surfaces 7, 8 have a load ball groove 9, semicircular in cross section, extending longitudinally over the entire length of the slide block. Each of the arms 6a, 6b has a no-load ball hole 10 cut therein passing through longitudinally the entire length of the slide block.

The guide rail 2 has a V-shaped recess formed on one side, the recess having a downwardly inclined surface 11. On the other side the guide rail 2 is formed with an upwardly inclined surface 12. Ball-rotating grooves 13, 14, semicircular in cross section, are formed longitudinally on the downwardly and upwardly inclined surfaces 11, 12 respectively.

The load ball grooves 9 of the slide block 1, when the guide rail 2 is inserted into the recess 5 of the slide block 1, mate with the ball-rotating grooves 13, 14 of the guide rail 2 to form load-carrying regions. The load-carrying regions or areas are connected at the front and rear ends with the no-load balls holes 10 formed in the arms 6a, 6b of the slide block 1 by means of the guide grooves 15 of the guide covers 4, thus forming endless tracks of the balls 3.

The balls 3 act as a series of load balls in the load-carrying regions formed by the load ball grooves 9 and the downwardly and upwardly inclined grooves 13, 14. In the no-load ball holes 10, the balls 3 form a series of no-load balls 3b.

In this embodiment, a total of four guide covers 4 are used to form two endless ball tracks, two each being provided on each end of the slide block 1. The ends of the load ball groove 9 formed in each arm of the slide block 1 are rounded as shown at 16 in FIG. 6 thereby enabling smooth circulation of balls, from the no-load ball hole 10 to the load-carrying regions and vice versa via the guide grooves 15 of the cover 4. The guide cover 4 is formed of steel plate shaped by the pressing machine and therefore it can be obtained at low cost.

Figure 4:
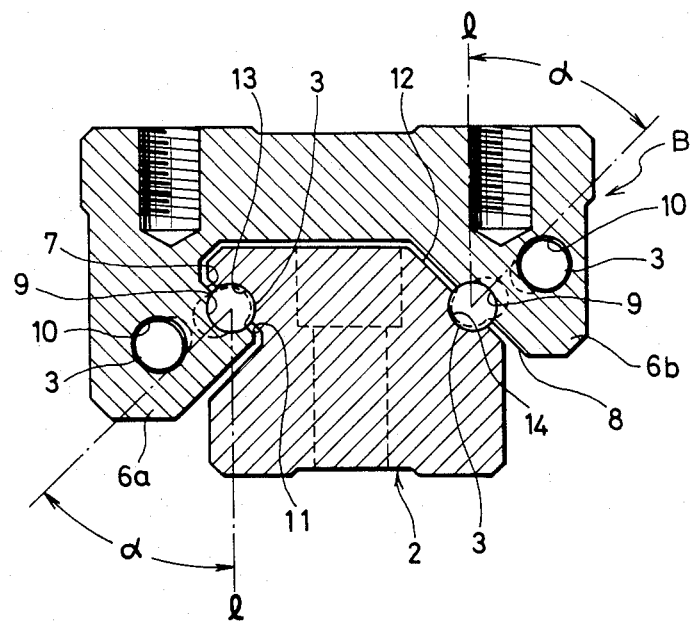
FIG. 4 is a cross-sectional view taken along the line IV—IV of FIG. 3.
Figure 5:
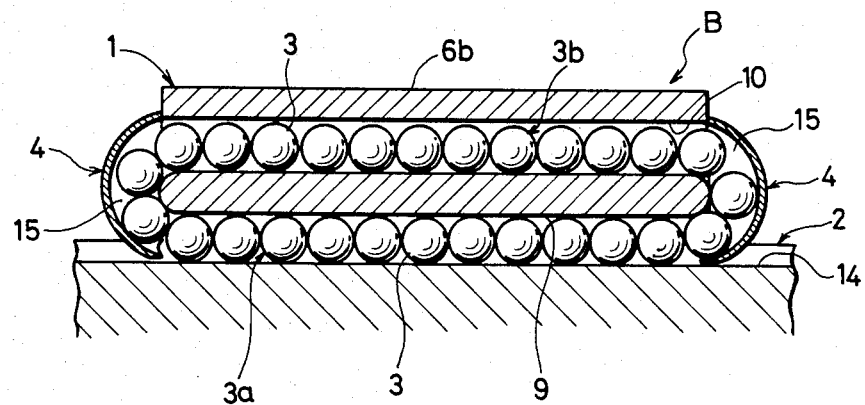
FIG. 5 is a cross-sectional view taken along the line V—V of the FIG. 1.
Figure 6:
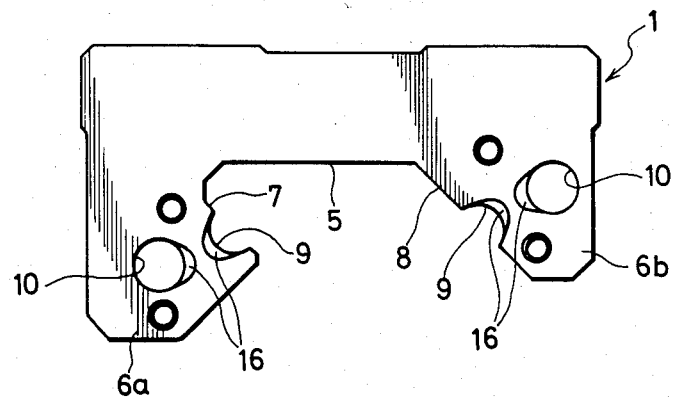
FIG. 6 is an end view of the slide block as shown in FIG. 1.
Figure 7:
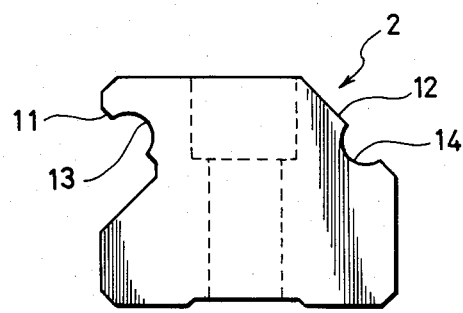
FIG. 7 is an end view of the guide rail as shown in FIG. 1.
Figure 8:
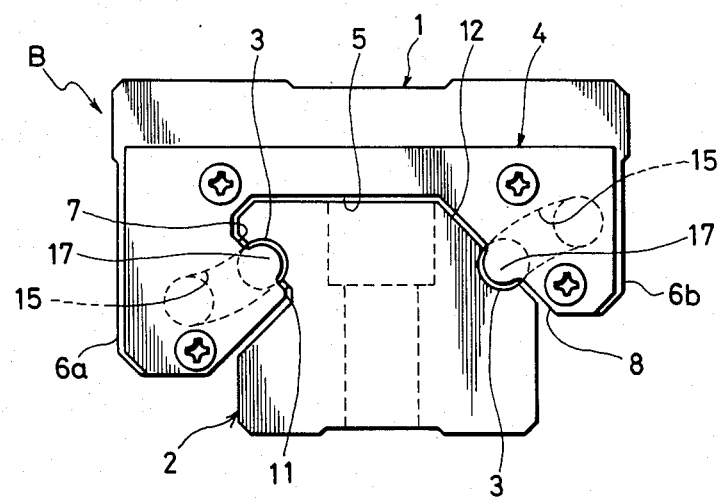
FIG. 8 is an end view showing the second embodiment of the linear slide bearing of this invention.
Figure 9:
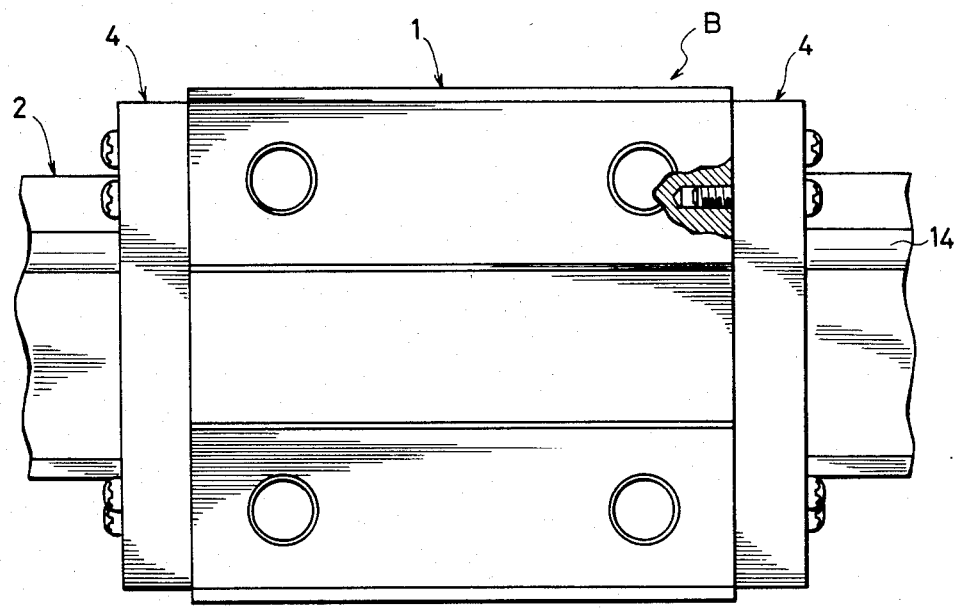
FIG. 9 is a plan view of the linear slide bearing as shown in FIG. 8.
Figure 10:
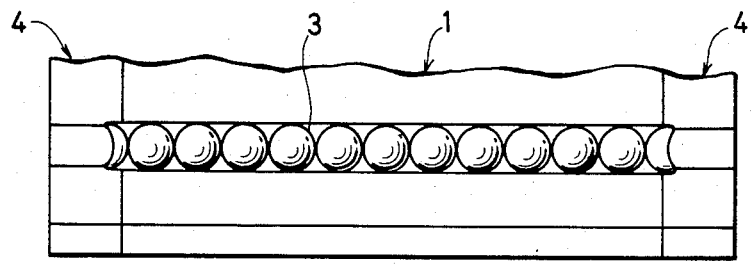
FIG. 10 is a cross-sectional view taken along the line X—X of FIG. 8 with the guide rail omitted.
Figure 11:
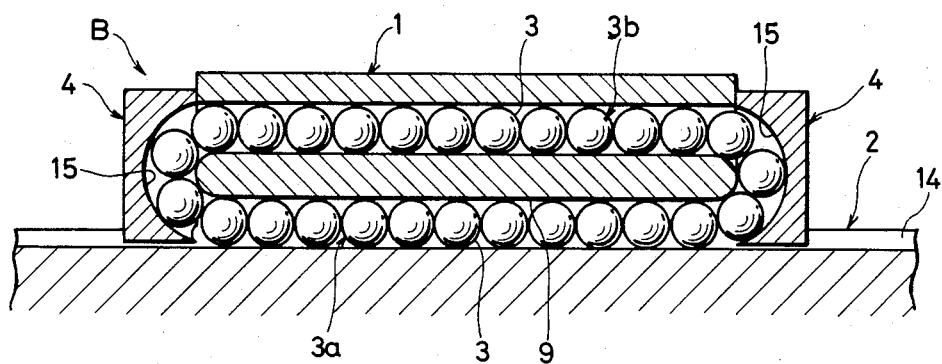
FIG. 11 is a cross-sectional view of the bearing as shown in FIG. 8 showing the similar cross section of FIG. 5.
Figure 12:
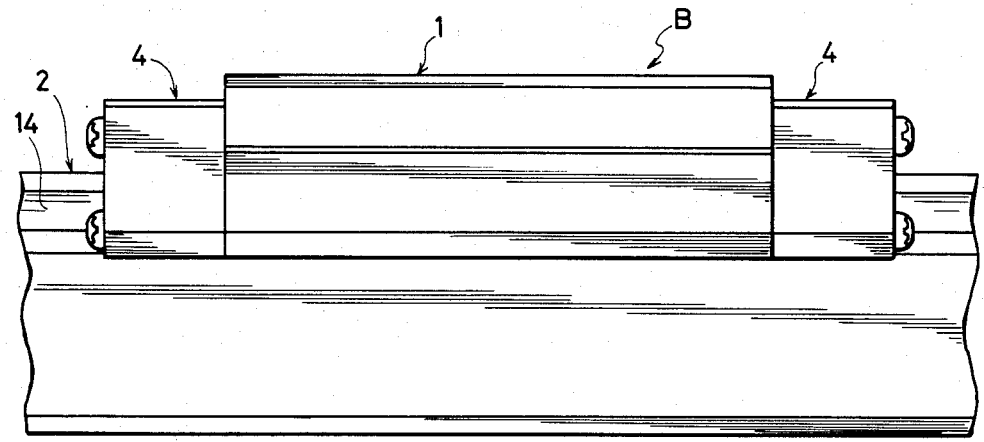
FIG. 12 is a front view showing the third embodiment of the linear slide bearing of this invention.
Figure 13:
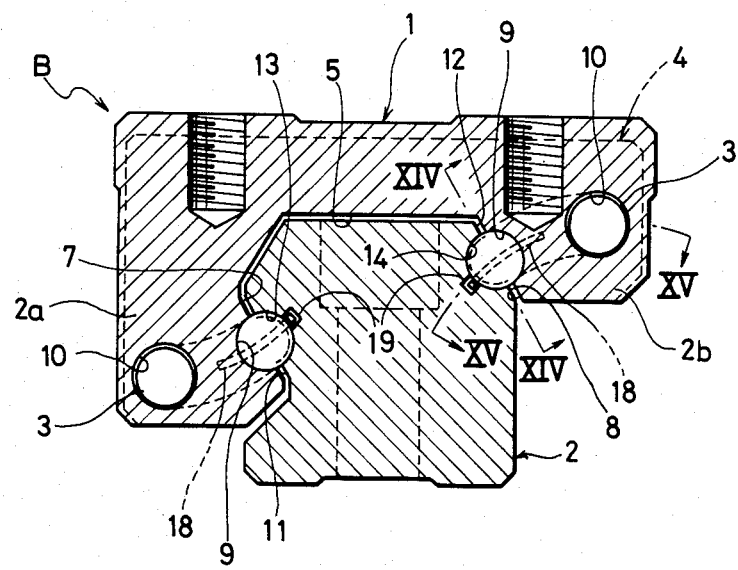
FIG. 13 is a cross-sectional view taken along the line XIII—XIII of FIG. 12.
Figure 14:
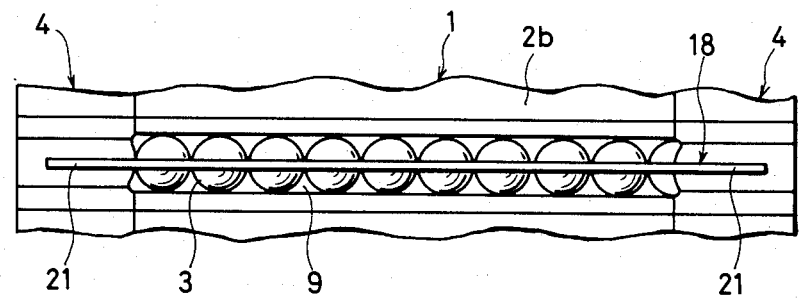
FIG. 14 is a cross-sectional view taken along the line XIV—XIV of FIG. 12 with the guide rail omitted.
Figure 15:
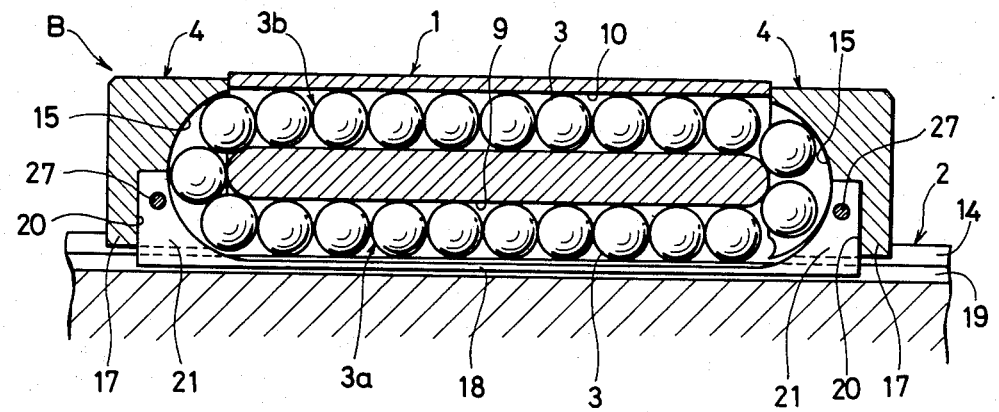
FIG. 15 is a cross-sectional view taken along the line XV—XV of FIG. 13.
Figure 16:
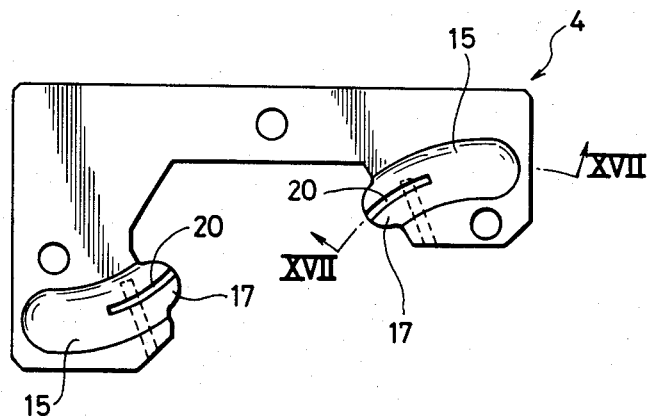
FIG. 16 is a side view of the guide cover as shown in FIG. 12.
Figure 17:
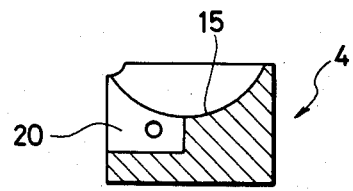
FIG. 17 is a cross-sectional view taken along the line XVII—XVII of FIG. 16.

This embodiment has another feature. That is, as shown in FIG. 4, the upwardly and downwardly inclined surfaces 7, 8 formed in the arms 6a, 6b of the table 1 as well as the upwardly and downwardly inclined surfaces 11, 12 on the guide rail 2 are slanted at 45 degrees. The load grooves 9 formed in the inclines surfaces 7, 8 of the slide block 1 and the ball-rotating grooves 13, 14 formed on the inclined surfaces 11, 12 of the guide rail 2 are semicircular in cross section. The balls 3 bearing load while running through the load-carrying region formed by the load ball grooves 9 and the ball-rotating grooves 13, 14, have the contact angle ($\alpha$) of 45 degrees as measured with the vertical line ($\lambda$) passing through the center of the ball used as a reference. Because of these, the bearing can sustain the radial or reverse-radial load or in any direction evenly. The contact angle ($\alpha$), however, can be changed according to the load distribution or the use of bearing by changing the angle of inclined surfaces 7, 8 of the slide block 1 and the inclined surfaces 11, 12 of the guide rail 2.

FIGS. 8 through 11 show the second embodiment of the linear slide bearing B of this embodiment. Unlike the first embodiment, the relatively thick guide covers 4 shaped similar to the end of the slide block 1 are attached to the ends of the slide block 1. The guide covers 4 are formed with a semicircular projection 17 projecting close to the ball-rotating groove 13 or 14 of the guide rail 2 to form a guide groove 15 in the inner side.

FIGS. 12 through 17 show the third embodiment of the linear slide bearing B of this embodiment. Between the guide grooves 4 attached to the ends of the slide block 1, a pair of ball retainers 18 formed of leaf spring are installed along the length of each load ball groove 9 of the slide block 1 so as to prevent the balls from coming off the load ball grooves 9 when the slide block 1 is removed from the guide rail 2. A slide groove 19 is cut in the guide rail 2 extending longitudinally along the bottom center of the ball-turning grooves 13, 14. As shown in FIGS. 14 through 17, the guide covers 4 are formed with a groove 20 into which an end base 21 of the ball retainer 18 is engaged. The retainer 18 is firmly secured by the spring pin 27.

Figure 18:
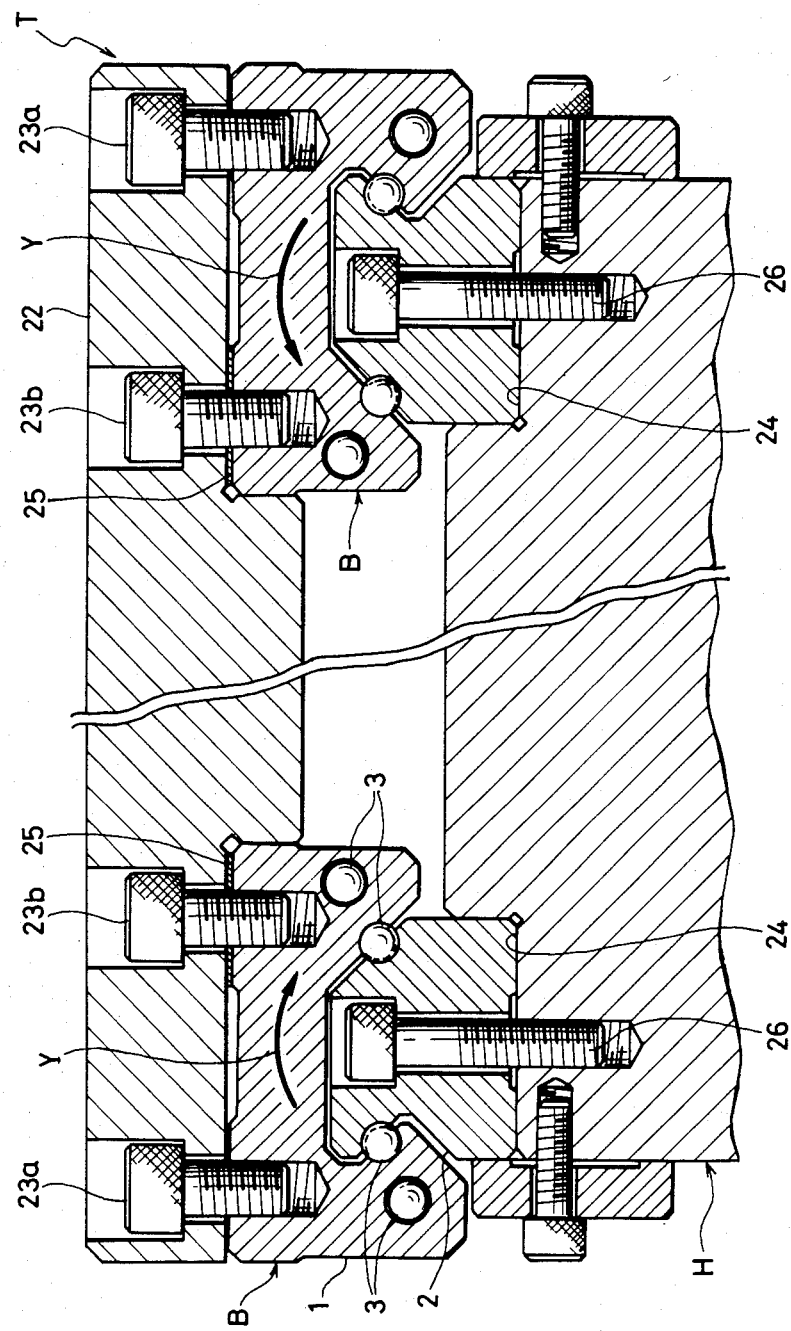
FIG. 18 is a cross-sectional view showing the linear slide table of this invention using the linear slide bearing of the first embodiment.

FIG. 18 shows the linear slide table T of this invention. This slide table T consists of: a pair of bearings B, each consisting of a slide block 1, guide rail 2, a number of balls 3 and guide covers 4; a mounting table 22 secured at both ends to the upper surfaces of the slide blocks 1; two pairs of connecting bolts 23a, 23b (a total of four bolts for one bearing B), the two bolts being aligned widthwise; and a bed H having base surfaces 24 on which the guide rails 2 of the bearings B are mounted and secured.

In this embodiment, a shim 25 is inserted between that part of the slide block upper surface corresponding to the arm 6b having the downwardly inclined surface 8 and the underside of the mounting table 22. By tightening the bolts 23a, 23b, the slide block 1 is slightly inclined by the thickness of the shim 25 and is therefore urged to turn in the direction of arrow Y to apply a preload to each bearing B.

In assembling the linear slide table T, the bearings B are secured to the base surfaces 24 of the bed H by the bolts 26. Then the mounting table 22 is installed on the upper surfaces of the slide blocks 1 of the bearings B; a shim 25 of appropriate thickness as determined by the preload to be applied to the bearing is inserted between the undersurface of the mounting table 22 and that part of the upper surface of the slide block 1 corresponding to the arm 6b having the downwardly inclined surface 8; and then the bolts 23a, 23b are tightened to give a certain amount of preload to each bearing B.

In the above embodiment, in applying preload to the bearing B the shim 25 is inserted between the mounting table 22 and the slide block 1 on the arm 6b having the downwardly inclined surface 8. It is also possible to give a preload to the bearing by placing a thick shim on the arm 6b having the downwardly inclined surface 8 and a thin shim on the arm 6a having the upwardly inclined surface 7 so that the preload is determined by the difference in thickness between the two shims.

Figure 19:
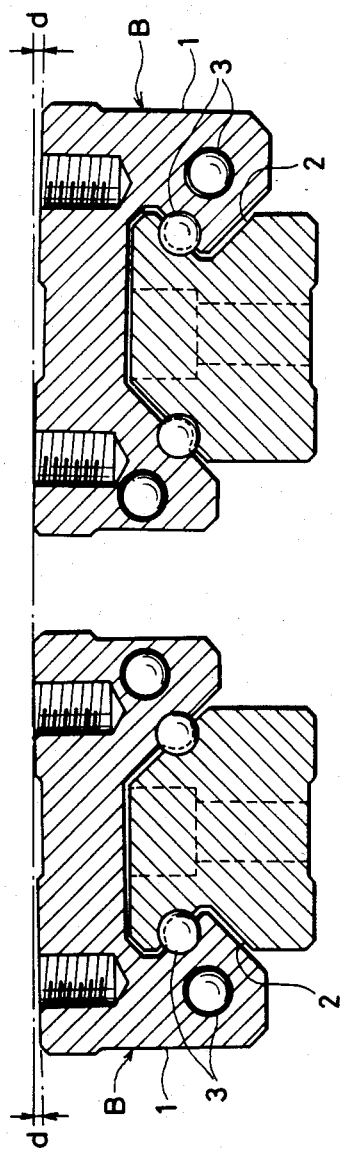
FIG. 19 is an explanatory drawing showing a modified means to apply a preload to the bearings making up the table.

Another means to apply preload to the bearing, as shown in FIG. 19, is to form bewteen the underside of the mounting table 22 and the upper surface of the slide block 1 of the bearing B, a gap d which expands gradually from the end of the slide block on the side of the arm 6b having the downwardly inclined surface 8 toward the other end on the arm 6a having the upwardly inclined surface 7, and then to fasten together the mounting table and the slide blocks by bolts (not shown). In forming the gap d, it is desirable to make the undersurface of the mounting table 22 horizontal and the upper surface of the slide block 1 of the bearing B inclined.

The linear slide bearing and the linear slide table using this bearing constructed as explained above have the following features and advantages.

Since the number of no-load ball grooves and ball-rotating grooves cut in the slide blocks and the guide rail can be halved, the manufacture becomes very simple and the cost is greatly reduced.

In each embodiment, since the slide block is formed as one piece, high rigidity of the block can be maintained. Further, the inclined surfaces of the slide block and the guide rail are slanted at 45 degrees; the contact angle of the balls is 45 degrees; and the load ball grooves and the ball-rotating grooves are formed semicircular in cross section. This construction enables the bearing to sustain radial or reverse radial load and in every direction.

In addition, the linear slide table of this invention can apply a preload to each bearing easily to increase the life and rigidity.

What is claimed is:

1. A linear slide bearing comprising:

a slide block having a recess formed on the underside, the slide block being formed in cross section into the shape of letter C, the slide block having an upwardly facing inclined surface on the upper inner side of one arm thereof and a downwardly facing inclined surface on the inner side of the other arm, the upwardly and downwardly facing inclined surfaces, each having a load ball groove semicircular in cross section, cut in the downwardly and upwardly facing inclined surfaces so that these grooves extend longitudinally along these surfaces, each arm of the slide block having a no-load ball hole cut longitudinally therethrough;

a guide rail having its upper portion formed into the shape similar in cross section to that of the recess of the slide block, the guide rail having a downwardly facing inclined surface formed by a V-shaped recess on one side and an upwardly facing inclined surface on the shoulder on the other side, the downwardly and upwardly facing inclined surfaces having longitudinally extending ball-rotating grooves semicircular in cross section; a plurality of balls acting as a series of load-carrying balls when running in the load region formed by the load ball grooves on the slide block and the mating ball-rotating grooves on the guide rail, the plurality of balls also acting as a series of no-load balls when running in the no-load ball holes in the slide block; and guide covers mounted to both ends of the slide block, the guide covers having guide grooves for guiding the balls between the load groove and the no-load hole.

2. A linear slide bearing as defined in claim 1, wherein the guide covers mounted to the ends of the slide block have a ball retainer installed along the load ball groove between the guide covers and the ball-rotating grooves of the guide rail are each formed with a groove running longitudinally into which the front end of the ball retainer is fitted over the entire length of the groove.

3. A linear slide table comprising:

a slide block having a recess formed on the underside, the slide block being formed in cross section into the shape of letter C, the slide block having a upwardly facing inclined surface on the upper inner side of one arm thereof and a downwardly facing inclined surface on the inner side of the other arm, the upwardly and downwardly facing inclined surfaces each having a load ball groove semicircular in cross section, cut in the downwardly and upwardly facing inclined surfaces so that these grooves extend longitudinally along these surfaces, each arm of the slide block having a no-load ball hole cut longitudinally therethrough;

a guide rail having its upper portion formed into the shape similar in cross section to that of the recess of the slide block, the guide rail having a downwardly facing inclined surface formed by a V-shaped recess on one side and an upwardly facing inclined surface on the shoulder on the other side, the downwardly and upwardly facing inclined surfaces having longitudinally extending ball-rotating grooves semicircular in cross section; a plurality of balls acting as a series of load-carrying balls when running in the load region formed by the load ball grooves on the slide block and the mating ball-rotating grooves on the guide rail, the plurality of balls also acting as a series of no-load balls in the no-load ball holes when running in the slide block; guide covers mounted to both ends of the slide block, the guide covers having guide grooves for guiding the balls between the loard groove andf the no-load hole; and a mounting table mounted on the upper surface of the slide blocks of the pair of bearings whose guide rails are secured to the base surface of the bed.

4. A linear slide table as defined in claim 3, wherein the guide covers attached the ends of the slide blocks of the pair of bearings have ball retainers installed along the load ball grooves between the slide blocks and the ball-rotating grooves on the gide rail are each formed with a groove running longitudinally into which the front end of the ball retainer is fitted over the entire length of the ball-rotating groove.

5. A linear slide table comprising:

a slide block having a recess formed on the underside, the slide block being formed in cross section into the shape of letter C, the slide block having an upwardly facing inclined surface on the upper inner side of one arm thereof and a downwardly facing inclined surface on the inner side of the other arm, the upwardly and downwardly facing inclined surfaces each having a load ball groove semicircular in cross section, cut in the downwardly and upwardly facing inclined surfaces so that these grooves extend longitudinally along these surfaces, each arm of the slide block having a no-load ball hole cut longitudinally therethrough;

a guide rail having its upper portion formed into the shape similar in cross section to that of the recess of the slide block, the guide rail having a downwardly facing inclined surface formed by a V-shaped recess on one side and an upwardly facing inclined surface on the shoulder on the other side, the downwardly and upwardly facing inclined surfaces having longitudinally extending ball-rotating grooves semicircular in cross section; a plurality of balls acting as a series of load-carrying balls when running in the load region formed by the load ball grooves on the slide block and the mating ball-rotating grooves on the guide rail, the plurality of balls also acting as a series of no-load balls when running in the no-load ball holes in the slide block;

guide covers mounted to both ends of the slide block, the guide covers having guide grooves for guiding the balls between the load groove and the no-load hole; and a mounting table mounted on the upper surface of the slide blocks of the pair of bearing whose guide rails are secured to the base surface of the bed; whereby the bearings are applied with a preload by bolts which are tightened when securing the mounting table to the slide blocks.

6. A linear slide table as defined in claim 5, wherein the bolts are used in pair for each bearing and aligned widthwise and a shim is inserted only between the undersurface of the mounting table and the that part of the upper surface of the slide block on the side of the arm having the downwardly facing inclined surface to apply a preload to the bearings by fastening the bolts.

7. A linear slide table as defined in claim 5, wherein the bolts are used in pair for each bearing and aligned widthwise, and a thick shim is inserted between the undersurface of the mounting table and that part of the upper surface of the slide block on the side of the arm having the downwardly facing inclined surface and a thin shim is inserted between the undersurface of the mounting table and that part of the upper surface of the slide block on the side of to the arm having the upwardly facing inclined surface so as to give a preload to each bearing by fastening the bolts.

8. A linear slide table as defined in claim 5, wherein the bolts are used in pair and aligned widthwise and a gap is formed between the upper surface of the slide block of each bearing and the underside of the mounting table, which gradually expands from the arm having the downwardly facing inclined surface toward the arm having the upwardly facing inclined surface, so as to apply a preload to each bearing by fastening the bolts.

* * * * *